United States Patent [19]

Peterson

[11] Patent Number: 5,063,863
[45] Date of Patent: Nov. 12, 1991

[54] TREE FERTILIZING TOOL USING AN AUGER AND MEASURING MEANS

[76] Inventor: Floyd F. Peterson, 7471 Main St. W., Webster, Wis. 54893

[21] Appl. No.: 563,488

[22] Filed: Aug. 7, 1990

[51] Int. Cl.⁵ .................... A01C 5/02; A01C 21/00
[52] U.S. Cl. .................... 111/93; 222/368; 111/95
[58] Field of Search ............ 111/89, 90, 91, 92, 111/93, 95, 116; 172/24, 25; 47/1.7; 222/368

[56] References Cited

U.S. PATENT DOCUMENTS

| 2,116,300 | 5/1938 | Campos | 222/368 |
| 2,125,574 | 10/1938 | Knight et al. | 222/368 |
| 2,230,846 | 2/1941 | Pettett | 111/95 |
| 2,718,856 | 9/1955 | Gathercoal | 111/95 |
| 3,014,443 | 12/1961 | Keyser et al. | 111/95 |
| 3,109,393 | 11/1963 | Dion | 111/89 |
| 3,204,833 | 9/1965 | Weitzner | 222/368 |
| 3,394,667 | 7/1968 | White | 111/89 |
| 3,695,193 | 10/1972 | Maier | 111/93 |
| 4,611,731 | 9/1986 | Häfner | 222/368 |
| 4,823,993 | 4/1989 | Siegal et al. | 222/368 |

FOREIGN PATENT DOCUMENTS

| 2854923 | 7/1979 | Fed. Rep. of Germany | 111/89 |
| 490866 | 2/1954 | Italy | 111/91 |
| 561535 | 6/1977 | U.S.S.R. | 111/90 |

Primary Examiner—Dennis L. Taylor
Assistant Examiner—Spencer Warnick
Attorney, Agent, or Firm—Merchant, Gould, Smith, Edell, Welter & Schmidt

[57] ABSTRACT

An apparatus for fertilizing soil includes a frame, a fertilizer storage canister and an earth drilling assembly which is movable relative to the frame and has a fluted, substantially vertical auger element. According to one aspect of the invention, a guide tube is provided to perform the dual function of guiding the auger element during drilling and guiding fertilizer into the hole once the auger element has been withdrawn. A second aspect of the invention regards a pre-measuring device which meters a predetermined amount of fertilizer into the guide tube upon actuation by an operator.

8 Claims, 3 Drawing Sheets

TREE FERTILIZING TOOL USING AN AUGER AND MEASURING MEANS

BACKGROUND OF THE INVENTION

1. Field of the Invention

This invention relates to machines which are used to apply granular fertilizer into the ground for agricultural purposes. More specifically, the invention relates to an improved apparatus for drilling a hole into the ground and for applying fertilizer into the hole which is more precise and longer lasting than machines which have heretofore been used.

2. Description of the Prior Art

A common technique for fertilizing trees and other plants in the agricultural industry today is to drill a hole in the ground and then to add fertilizer into the hole. At least one machine, which is disclosed in U.S. Pat. No. 3,695,193 to Maier, has been developed for automatically performing this type of fertilizing procedure.

Drilling and fertilizing machines such as that disclosed in the Maier patent can save a great deal of labor and time, particularly in large agricultural operations. However, one problem that has previously existed in such machines is their inability to precisely control the amount of fertilizer that is being applied into each hole after it is drilled. This can result in a waste of fertilizer, or in not enough fertilizer being applied to any one hole.

Another problem which plagues machines such as that disclosed in the Maier patent is the tendency of certain parts in their fertilizing dispensing system to become rusted or otherwise corroded during prolonged periods of use. This results in the need for frequent lubrication, or for replacement of those parts periodically.

Another problem with such machines is that their augers are difficult to laterally stabilize during drilling. This can result in holes being drilled which are larger than necessary and can create forces and jerks which can be transmitted to the operator through the machine.

Finally, such machines often require repositioning of the machine relative to the hole after drilling in order to apply fertilizer into the hole. This can make it difficult or tiresome to accurately guide the fertilizer into each hole.

It is clear that there has existed a long and unfilled need in the prior art for a soil drilling and fertilizing tool which is resistant to rust and corrosion, which provides lateral guidance for the auger element during drilling, which does not require repositioning of the machine relative to the hole after drilling to apply fertilizer into the hole and which is able to accurately apply a pre-measured amount of fertilizer into the hole.

SUMMARY OF THE INVENTION

Accordingly, it is an object of the invention to provide a machine for drilling and fertilizing soil which is resistant to rust and other corrosion.

It is further an object of the invention to provide a soil drilling and fertilizing machine which provides lateral guidance to its auger element during drilling.

It is yet further an object of the invention to provide a soil drilling and fertilizing tool which does not require repositioning after drilling in order to apply fertilizer into the hole.

It is another object of the invention to provide a soil drilling and fertilizing tool which is able to dispense a predetermined amount of fertilizer into each hole after it is drilled.

In order to achieve these and other objects of the invention, an apparatus according to a first aspect of the invention includes a frame; auger structure movably mounted on the frame for drilling into the ground; structure connected to the frame for storing fertilizer; structure for pre-measuring a predetermined amount of fertilizer from the storing structure; and structure for feeding the predetermined amount of fertilizer from the pre-measuring structure to a location which is proximate the auger structure, whereby the apparatus may be used to drill a hole into the ground and to fertilize the hole.

According to a second aspect of the invention, an apparatus for guiding an auger and for guiding a stream of fertilizer in an assembly for drilling and fertilizing soil includes a longitudinally extending guide tube having a cylindrical inner surface with a diameter that is slightly greater than a maximum outer diameter of an auger which is to be guided; an orifice defined in the inner surface; and a feed nipple having an inner space in communication with the orifice, the feed nipple having access which is oblique with respect to the axis of the guide tube, whereby fertilizer may be fed from the feed nipple into the guide tube under the force of gravity.

According to a third aspect of the invention, an apparatus for fertilizing soil includes a frame, auger structure movably mounted on the frame for drilling into the ground, structure connected to the frame for storing fertilizer; and structure for feeding fertilizer from the storing structure, the feeding structure comprising structure for guiding fertilizer along a path which is coaxial with a longitudinal axis of the auger element.

A method according to a fourth aspect of the invention includes the steps of (a) using an auger to drill a hole in the ground while laterally guiding the auger within a cylindrical guide tube; (b) withdrawing the auger above the guide tube; and (c) introducing fertilizer into the guide tube so that the guide tube guides the fertilizer into the hole.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
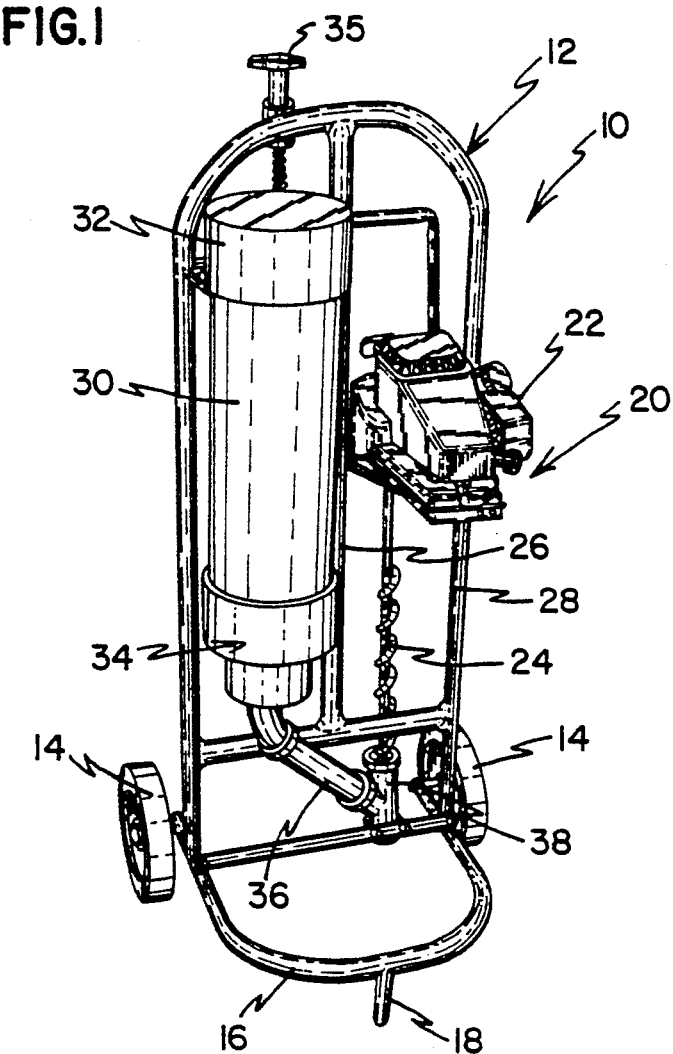
FIG. 1 is a perspective view of a soil drilling and fertilizing apparatus according to a first embodiment of the invention.

Referring now to the drawings, wherein like reference numerals designate corresponding structure throughout the views, and referring in particular to FIG. 1, an improved soil fertilizing tool 10 constructed according to a preferred embodiment of the invention includes a frame 12 having a pair of wheels 14 rotatably mounted at a lower end thereof. As may be seen in FIG. 1, frame 12 includes a stand member 16 having a support leg 18 depending therefrom. Stand member 16 and support leg 18 allow the frame 12 to be balanced in an upright position on a tripod which consists of the wheels 14 and support leg 18. In this position, stand member 16 is substantially horizontal with respect to the ground or other underlying surface and the remainder of frame 12 is substantially vertical with respect to the underlying surface.

An earth drilling assembly 20 is mounted for vertical movement with respect to frame 12. Earth drilling assembly 20 includes a motor 22 and a fluted auger member 24, as may be seen in FIG. 1. The specific details of construction for earth drilling assembly 20 need not be described as the specific details of its construction are readily available to those skilled in the art. In the preferred embodiment, earth drilling assembly is vertically slidable with respect to a left guide member 26 and a right guide member 28 of frame 12. As a result, an operator can manually urge the earth drilling assembly and its auger member 24 linearly downward to drill a hole in the ground, and then retract the assembly 20 so that it is returned to its uppermost position with respect to frame 12.

Looking again to FIG. 1, a storage canister 30 is fixedly mounted to the frame 12 so that the longitudinal axis of canister 30 will be substantially vertical when frame 12 is supported on its upright position on the stand member 16. Canister 30 includes a removable cover 32 that can be removed when it is desired to fill storage canister 30 with a material such as granular fertilizer. A pre-measuring assembly 34 is attached to a lower end of storage canister 30. The purpose of pre-measuring assembly 34 is to dispense a predetermined amount of fertilizer from the storage canister 30 into a feed pipe 36 when a handle 35 is actuated by an operator. As may be seen in FIG. 1, handle 35 is positioned near the top of frame 12 so as to be readily accessible to an operator. Feed pipe 36 angles downwardly from pre-measuring assembly 34, and is connected to a combined auger guide and feed outlet 38 at its lower end. The pre-measuring assembly 34 and the combined auger guide and feed outlet 38 will be discussed in greater detail below.

Figure 2:
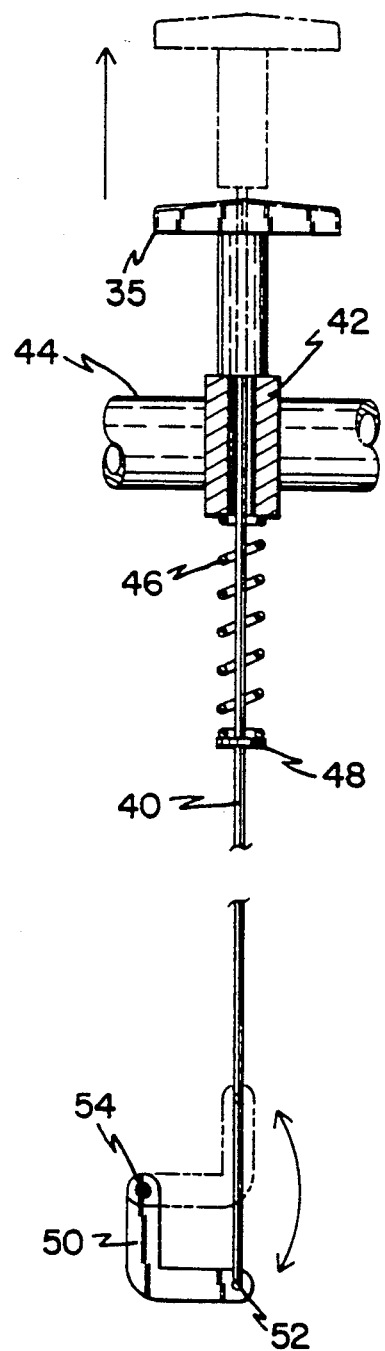
FIG. 2 is a rear elevational view of the apparatus which is depicted in FIG. 1.

FIG. 2 is a rear elevational view of an apparatus constructed according to the preferred embodiment of the invention. As may be seen in FIG. 2, handle 35 is connected to a control link 40, which is constrained to move linearly in a direction that is substantially parallel to the vertical axis of frame 12 by a guide bushing 42. Guide bushing 42 is secured to an upper transverse element 44 of frame 12. A helical compression spring 46 is interposed between a lower surface of guide bushing 42 and a spring stop member 48 which is integral with and which protrudes radially from control link 40. Helical compression spring 46 thus acts to bias control link 40 to a downward position.

A substantially L-shaped control lever 50 is pivotally mounted with respect to a lower end of control link 40 by a pivot joint 52, as is shown in FIG. 2. A second end of control lever 50 is fixed to rotate with a rotatable control rod 54 of the pre-measuring assembly 34, as will be described in greater detail below. When no external forces are being applied to handle 35, helical compression spring 46 biases control link 40 downwardly, which causes control lever 50 to assume a first angular position, which is illustrated in phantom lines in FIG. 2. When an operator pulls handle 35 upwardly, control lever 50 is forced into a second angular position, as is shown in solid lines in FIG. 2. The significance of the two positions of control lever 50 will be discussed in greater detail below.

Figure 3A:
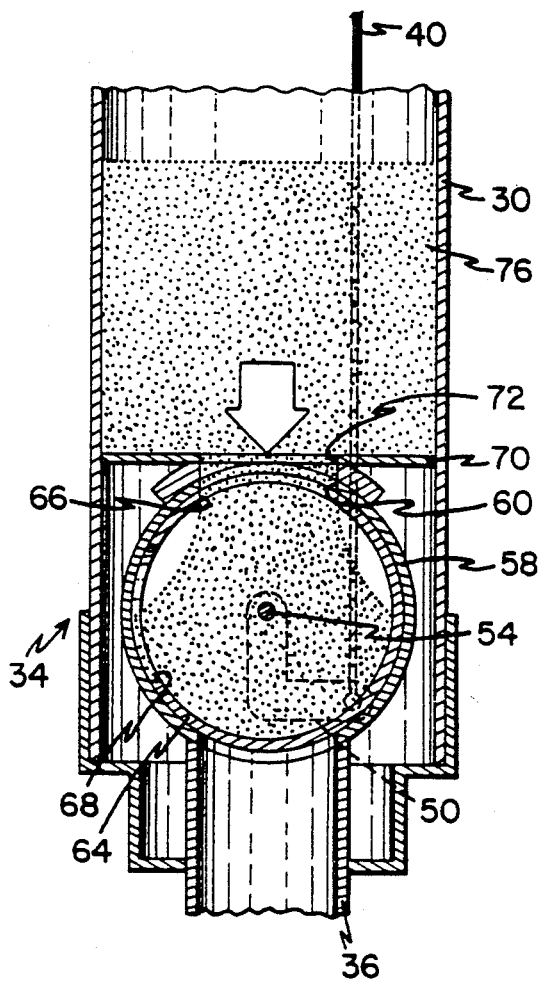
FIGS. 3A and 3B are fragmentary cross sectional views taken through a portion of the apparatus which is illustrated in FIGS. 1 and 2.
Figure 3B:
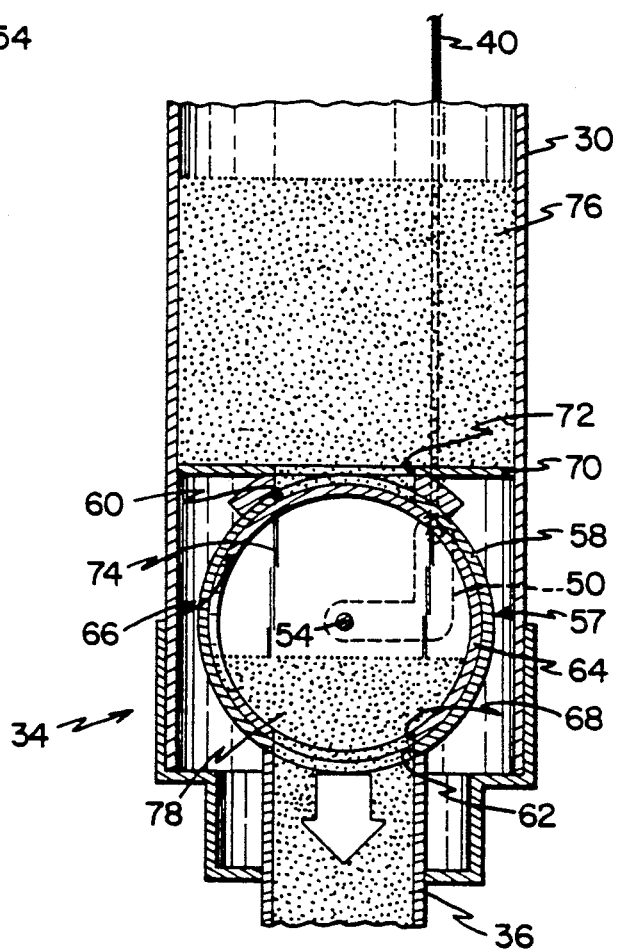

FIG. 3A illustrates the pre-measuring assembly 34 when control lever 50 is in the first angular position. FIG. 3B illustrates pre-measuring assembly 34 when the control lever 50 is in the second angular position. As may be seen in FIGS. 3A and 3B, pre-measuring assembly 34 includes a fixed drum 58 which forms a cylindrical socket within which a rotatable inner drum 64 can rotate. Fixed drum 58 has a supply opening defined in an upper surface thereof which is immediately beneath the storage canister 30 by a cylindrical inner surface 60. A cylindrical surface 62 defines a similarly sized feed opening in a lower portion of fixed drum 58 which is positioned immediately above the uppermost end of feed pipe 36, as may best be seen in FIG. 3B. The rotatable inner drum 64 is mounted for rotation with control rod 54 and thus with control lever 50. A first opening is defined in inner drum 64 by a cylindrical wall 66. The first opening defined by wall 66 is in communication with the supply opening defined by wall 60 and fixed drum 58 when control lever 50 is in its first angular position, as is illustrated in FIG. 3A. A second opening is defined in inner drum 64 by a cylindrical wall 68. The second opening defined by wall 68 is in communication with the feed opening that is defined in fixed drum 58 by wall 62 when the control lever 50 is in its second angular position, as is depicted in FIG. 3B. The bottom of storage canister 30 is defined by a horizontal plate 70, which has an orifice defined therein by a cylindrical inner wall 72. The orifice defined by wall 72 is continuously in communication with the supply opening that is defined in fixed drum 58 by wall 60.

The space that is defined within the rotatable inner drum 64 forms a measuring chamber 74 from which granular fertilizer or the like may be dispensed. When control lever 50 is in its first angular position, fertilizer 76 which is stored in the storage canister 30 is allowed into measuring chamber 74, as is shown in FIG. 3A. However, when an operator pulls handle 35, the control lever 50 is forced into its second angular position, which discommunicates measuring chamber 74 from storage canister 30, and communicates measuring chamber 74 to the feed pipe 36. As a result, a measured amount 78 of fertilizer is dispensed into feed pipe 36 for application into a hole as will be described in greater detail below.

Figure 4B:
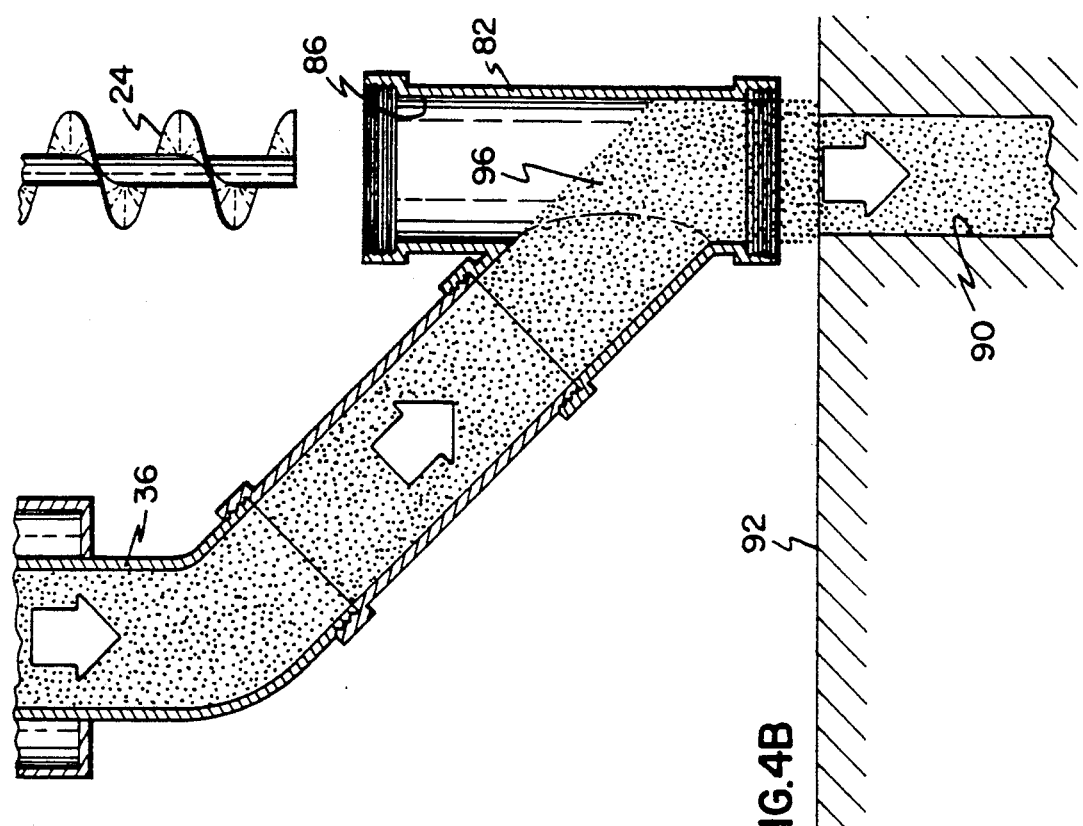
FIGS. 4A and 4B are fragmentary cross sectional views taken through a second element of the apparatus which is illustrated in FIGS. 1 and 2.
Figure 4A:
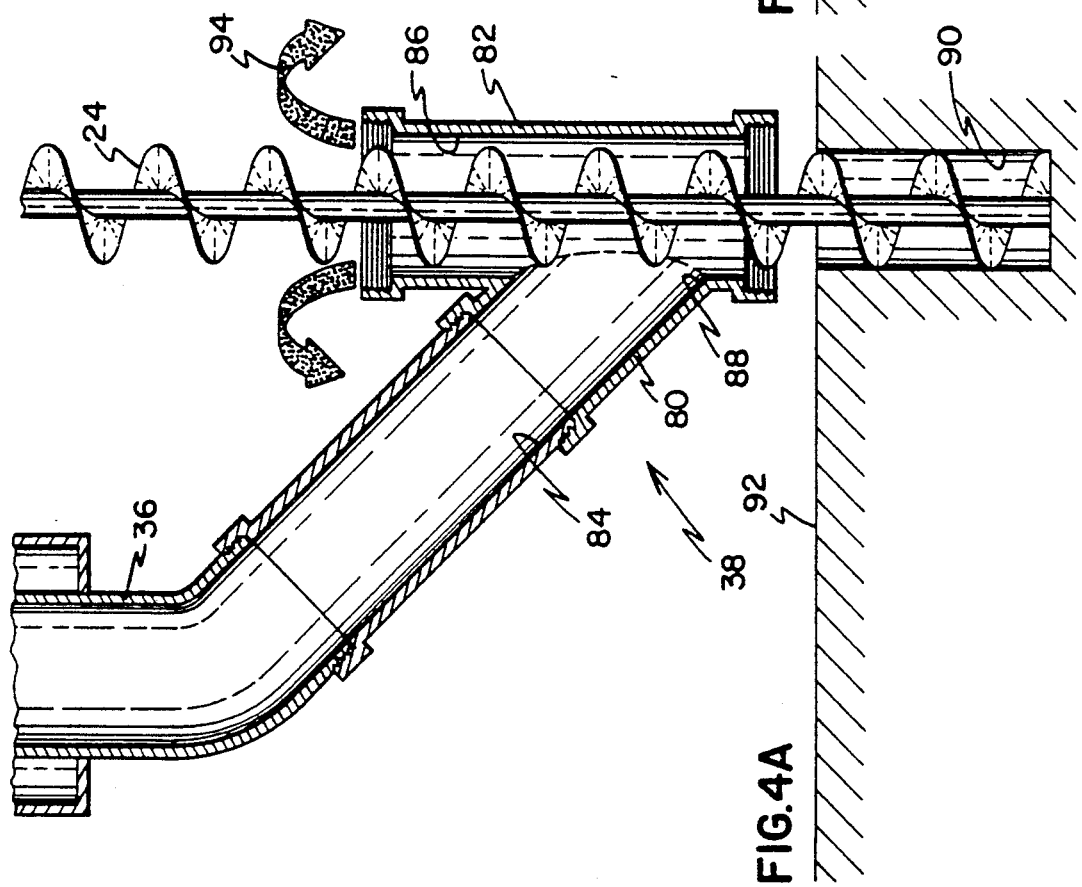

Turning now to FIGS. 4A and 4B, the combined auger guide and feed outlet 38 includes a vertical guide tube 82 which has a cylindrical inner guide surface 86 defined therein. The inner diameter of the cylindrical inner guide surface 86 is preferably slightly larger than the maximum outer diameter of auger member 24, so that the vertical guide tube 82 can provide lateral guidance and support to auger member 24 during drilling. A feed nipple 80 extends obliquely from the vertical guide tube 82. Feed nipple 80 has a feed guide path defined by an inner cylindrical surface 84, which is in communication with the space defined by cylindrical inner surface 86 of guide tube 82 by an orifice 88 which is defined within the cylindrical inner guide surface 86. An upper end of feed nipple 80 is in communication with the lower end of feed pipe 36, so that granular fertilizer which is dispensed from pre-measuring assembly 34 will be guided into feed nipple 80, and thus into vertical guide tube 82.

In operation, an operator positions tool 10 over an area in which a hole is to be drilled by tilting frame 12 and pushing the tool 10 on its wheels 14. The frame 12 is then stood up upon its wheels 14 and the support leg 18. At that time, the operator starts the motor 22, and engages auger 24 to begin rotating. Earth drilling assembly 20 is pushed downwardly, which causes auger member 24 to move through vertical guide tube 82 into the ground 92, in which a hole 90 is drilled. During this time, the auger 24 is laterally supported by the cylindrical inner surface 86 of vertical guide tube 82. As a result, hole 90 is cleaner and is drilled more efficiently than would otherwise be possible. The drilling position is illustrated in FIG. 4A.

After drilling, earth drilling assembly is retracted by the operator, which causes auger 24 to rise to the position illustrated in FIG. 4B. At this time, the operator pulls handle 35, which moves control lever 50 to its second angular position, as is illustrated in FIG. 3B. In this position, a measured amount 78 of fertilizer from measuring chamber 74 is allowed to drop into feed pipe 36 through the second opening which is defined in inner drum 64 by wall 68 and the feed opening which is defined in fixed drum 58 by wall 62. The measured amount of fertilizer 78 is guided by feed pipe 36 into feed nipple 80, from whence it exits into vertical guide tube 82. The cylindrical inner surface 86 of vertical guide tube 82 then guides the stream of fertilizer 96 along a path which is coaxial with a longitudinal axis of auger element 24. As a result, the stream 96 of fertilizer is constrained to fall accurately and neatly into hole 90, with a minimum of waste. Once all of the fertilizer has been drained from measuring chamber 74, the operator ceases to exert force on handle 35, which allows helical compression spring 46 to bias the control lever 50 to its first angular position, as is illustrated in FIG. 3A. Stored fertilizer 76 from storage canister 30 is then allowed to refill the measuring chamber 74, since the first opening defined by a wall 66 in inner drum 64 is in communication with the openings defined by walls 60, 72 in the fixed drum 58 and horizontal plate 70, respectively. The operator may then wheel the tool 10 to another position, and repeat the process.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for fertilizing soil comprising:
a frame;
auger means movably mounted on said frame for drilling into the ground;
means connected to said frame for storing fertilizer;
means for pre-measuring a predetermined amount of fertilizer from said storing means; and
means for feeding the predetermined amount of fertilizer from said pre-measuring means to a location which is proximate said auger means, said pre-measuring means comprising means defining a measuring chamber which is positioned beneath said storing means, said measuring chamber comprising a hollow drum which is mounted for rotation within a cylindrical socket, first means for opening a passage between said storing means and said measuring chamber so that said measuring chamber is allowed to fill, and second means for opening a passage between said measuring chamber and said feeding means, said second means comprising a feed opening defined in said socket which is in communication with said feeding means, and a second opening defined in said drum for communicating with said feed opening when said drum is in a second angular position, whereby a measured amount of fertilizer is allowed to pass into said feeding means.

2. An apparatus for fertilizing soil comprising:
a frame;
auger means movably mounted on said frame for drilling into the ground, said auger means comprising a fluted auger element;
means connected to said frame for storing fertilizer;
means for pre-measuring a pre-determined amount of fertilizer from said storing means; and
means for feeding the pre-determined amount of fertilizer from said pre-measuring means to a location which is proximate said auger means, said feeding means further comprising means for guiding the pre-measured amount of fertilizer along a path which is coaxial with a longitudinal axis of said auger element, whereby the apparatus may be used to drill a hole in the ground and to fertilize the hole.

3. An apparatus according to claim 2, wherein said guiding means further is configured to provide lateral guidance to said auger element while said auger means is being used to drill a hole in the ground.

4. An apparatus according to claim 3, wherein said guiding means comprises a vertical guide tube which is attached to said frame and has a cylindrical inner surface, an orifice defined in said inner surface, and a hollow feed nipple in communication with said orifice, said feed nipple being in communication with said measuring means, whereby fertilizer may be introduced into said guide tube for said measuring means.

5. An apparatus for fertilizing soil, comprising:
a frame;
auger means movably mounted on said frame for drilling into the ground;
means connected to said frame for storing fertilizer; and
means for feeding fertilizer from said storing means, said feeding means comprising means for guiding fertilizer along a path which is coaxial with a longitudinal axis of said auger element and for providing lateral guidance to said auger element while said auger means is being used to drill a hole in the ground, said guiding means further comprising a vertical guide tube which is attached to said frame and has a cylindrical inner surface, an orifice defined in said inner surface, and a hollow feed nipple in communication with said orifice, said feed nipple being in communication with said measuring means, whereby fertilizer may be introduced into said guide tube from said measuring means.

6. An apparatus for guiding an auger and for guiding a stream of fertilizer in an assembly for drilling and fertilizing soil, comprising:

a longitudinally extending guide tube having a cylindrical inner surface with a diameter that is slightly greater than a maximum outer diameter of an auger which is to be guided;

an orifice defined in said inner surface; and a feed nipple having an inner space in communication with said orifice, said feed nipple having an axis which is oblique with respect to the axis of said guide tube, whereby fertilizer may be fed from said feed nipple into said guide tube under the force of gravity.

7. A method of drilling and fertilizing a hole in the ground, comprising:

(a) using an auger to drill a hole in the ground while laterally guiding the auger within a cylindrical guide tube;

(b) withdrawing the auger above the guide tube; and (c) introducing fertilizer into the guide tube so that the guide tube guides the fertilizer into the hole.

8. A method according to claim 7, further comprising the step of pre-measuring an amount of fertilizer prior to step (c).

* * * * *